United States Patent [19]

Robinson

[11] 4,220,343
[45] Sep. 2, 1980

[54] BOWLING BALL STORAGE AND TRANSPORTATION APPARATUS

[76] Inventor: Charles H. Robinson, 1066 Thompson, Glendale, Calif. 91201

[21] Appl. No.: 894,988

[22] Filed: Apr. 10, 1978

Related U.S. Application Data

[62] Division of Ser. No. 826,367, Aug. 23, 1977, Pat. No. 4,166,530.

[51] Int. Cl.$^2$ ............................................. A45C 5/14
[52] U.S. Cl. ...................... 280/33.99 T; 206/315 B; 206/509; 220/252; 280/79.2
[58] Field of Search .......... 280/79.1 R, 79.2, 33.99 T; 296/35 A; 220/252, 350; 206/509, 315 B; 150/52 A

[56] References Cited

U.S. PATENT DOCUMENTS

| | | | |
|---|---|---|---|
| 2,606,652 | 8/1952 | Jaquette et al. | 220/350 X |
| 2,677,483 | 5/1954 | Shaw | 206/509 X |
| 2,736,452 | 2/1956 | Roop | 220/252 X |
| 3,258,091 | 6/1966 | Stevens | 150/52 A X |
| 3,308,911 | 3/1967 | Stevens et al. | 206/315 B X |
| 3,376,046 | 4/1968 | Kivett et al. | 280/33.99 T |
| 3,401,933 | 9/1968 | Fenkel | 206/509 X |
| 4,066,156 | 1/1978 | Basile | 150/52 A X |

*Primary Examiner*—John J. Love
*Assistant Examiner*—Michael Mar
*Attorney, Agent, or Firm*—Michael A. Painter

[57] ABSTRACT

An apparatus for carrying, stacking and transporting bowling balls. A housing of suitable size for holding a bowling ball incorporates interlocking members on the top and bottom surfaces thereof. A substantially square or rectangular member depends from the top surface of the housing, the member adapted to receive and be vertically interlocked with a mating member depending from the bottom surface of a like housing. Innerconnection of the mating members, one to the other, will permit vertical stacking of the housings or cases and prevent inadvertent vertical movement thereof. Each housing is equipped with an internally moveable cover to secure the bowling ball within the housing, the cover binding the ball between the interior walls of the housing and the covering member itself.

6 Claims, 7 Drawing Figures

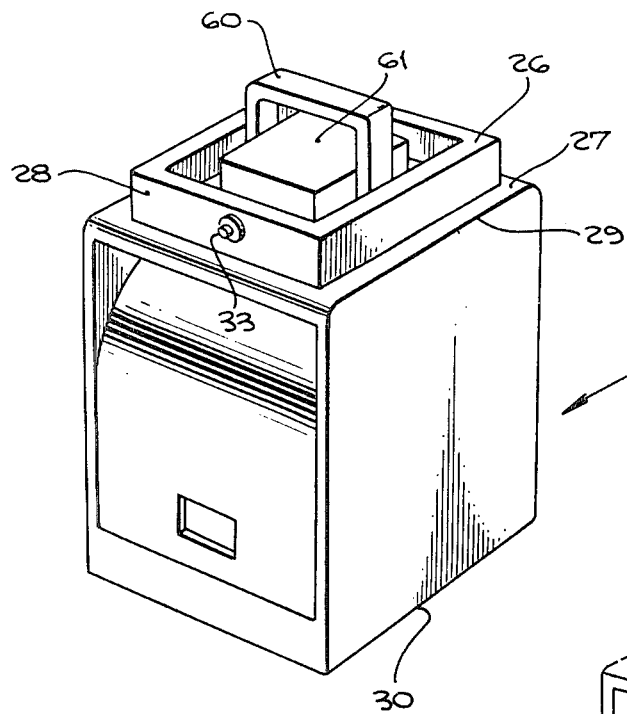
Fig. 6.
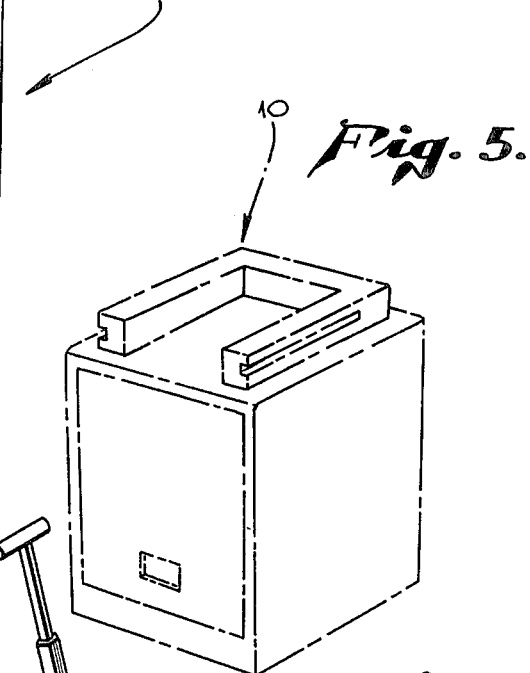
Fig. 5.
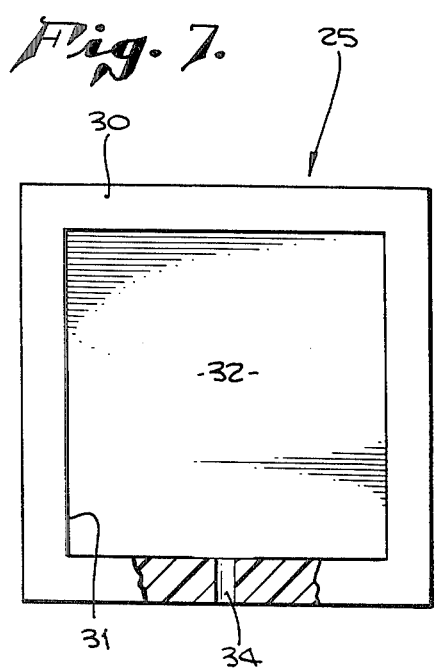
Fig. 7.
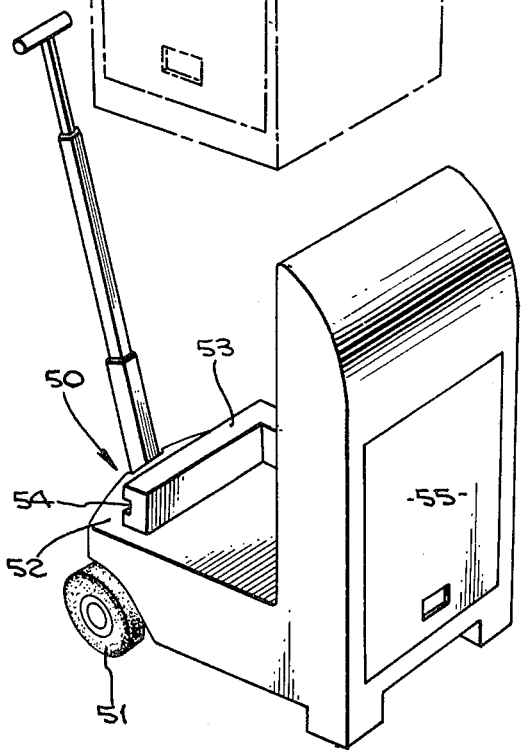

BOWLING BALL STORAGE AND TRANSPORTATION APPARATUS

This is a division of application Ser. No. 826,367, filed Aug. 23, 1977, now U.S. Pat. No. 4,166,530.

BACKGROUND OF THE INVENTION

1. Field of the Invention

The present invention generally relates to structures used for carrying heavy objects and more particularly to cases used for holding and carrying bowling equipment.

2. Prior Art

With the increased popularity of sports such as bowling, the need for apparatus which facilitates and simplifies the sport is evident. One of the biggest problems inherent in the sport of bowling is the ability to easily move and store the ball. The problem arises out of the weight of the ball which is typically 16 pounds. The weight and the difficult nature of storage have presented a great number of problems which have remained unresolved by the devices disclosed in the prior art. The typical case for carrying bowling balls is merely a structure comprised of a flexible shell within which the ball is disposed. Where soft material is used for the casing, a zipper is used to enclose the ball, a pair of handles being used to provide means for carrying. Where fiberglass or other rigid materials are employed, a pair of half-shells are hinged and an appropriate latch is used to secure the shells. As in the first case, a pair of handles are generally employed for carrying the bag. One of the points which is common to these types of structures is the lack of uniformity. The casings are not uniform and therefore are extremely difficult to move, stack or otherwise store.

Other problems relating to the weight and storing problem have been addressed by the prior art. In one structure disclosed by the prior art, a box-like configuration is molded from plastic and includes a recessed carrying handle. Other than the fact that the structure defines a more uniform configuration, there is no provisions for means to facilitate the storage of the cases as well as provide means for moving a plurality of like housings. Other bowling ball carrying devices disclosed by the prior art utilize wheeled carriers in a manner which is similar to those employed for other sporting equipment, i.e., golf clubs. In all cases, the problems which existed were not fully resolved thereby requiring a new approach.

The present invention substantially resolves those problems left unsolved by the apparatus disclosed by the prior art. A bowling ball carrier and housing is constructed in a substantially cubical form. The top and bottom surfaces of the housing are equipped with interlocking structures whereby the bottom of one bowling ball case can be interlocked vertically to the top surface of a like case. Since the present invention cases will be accessible only on the side wall, an internally pivoting cover is employed. The cover is fully contained within the interior of the cubical housing, the interior wall being fitted with means for preventing the bowling ball from moving or otherwise shifting while it is being transported. In the above manner, the present invention provides means for vertically stacking or storing the bowling ball cases in a manner which will prevent them from inadvertently falling while providing the simultaneous aid in the movement of the equipment.

SUMMARY OF THE INVENTION

The present invention comprises an improved structure used to carry, store or otherwise transport bowling equipment. A substantially cubical or other uniform geometrical shape is utilized for the structure of the housing. Although the scope of the present invention is broad enough to cover the transport of substantially any type of object, the following discussion will relate specifically to the transport, carrying and storage of bowling balls. The basic housing utilized to store the bowling ball has matched interlocking members on the upper and lower walls of the housing. The connecting member either depends from or is affixed to the top surface of the housing and is adapted to fit into a mating connector which will be mounted or depending from the bottom wall of an adjacent housing. In this manner, the cases can be stacked one upon the other. Where the specific application requires that the cases be moved, the interlocking members can be modified to provide for a locking interconnection between the mating members.

The spherical ball disposed within the housing will be accessible only from a side wall of the case. In order to provide access to the case, an internally opening cover is used. The cover is pivotally joined to opposed interior walls of the case and is adapted to be rotated inwardly about the surface of the ball. The upper portion of the cover has a radial profile which will allow it to move across the surface of the ball without making substantial contact thereto. The radial portion of the cover depends into a tangential, flat lower section which will provide for a substantially flush fitting of the cover to the remainder of the casing wall when the cover is in a closed position. The interior portion of the cover has an inwardly directed shim which has a concave curvature which will contact the surface of the ball when the cover is in the closed position. The concave shim secured to the inner surface of the cover will contact the surface of the ball both above and below the equator of the ball thereby preventing it from moving in any direction when the cover of the housing is in a closed position. A transporting system interlocks with the mating on the bottom wall of a housing to provide the support necessary to safely move the cases.

The present invention apparatus provides means for stacking a plurality of heavy bowling balls in the space which was previously only occupied by a single ball. In addition, the balls stored are accessible even when the structures are stacked in position, the stacked cases being joined together in a manner which would effectively preclude inadvertent dislodgement of the cases.

It is therefore an object of the present invention to provide an improved bowling ball storage and transporting apparatus.

It is another object of the present invention to provide a bowling ball storage apparatus that can be vertically stacked.

It is still yet another object of the present invention to provide a bowling ball storage apparatus which can be accessed when in a vertical stack of a plurality of said apparatus.

It is still yet another object of the present invention to provide a bowling ball storage apparatus which is simple and inexpensive to fabricate.

The novel features which are believed to be characteristic of the invention, both as to its organization and method of operation, together with further objectives

BRIEF DESCRIPTION OF THE DRAWING

FIG. 5 is a moving apparatus used to store and transport the bowling ball storage case shown in FIG. 1.

FIG. 6 is a perspective view of another form of the present invention bowling ball storage cases.

FIG. 7 is a bottom plan view of the form of the present invention shown in FIG. 6.

DESCRIPTION OF THE PRESENTLY PREFERRED EMBODIMENT

Figure 1:
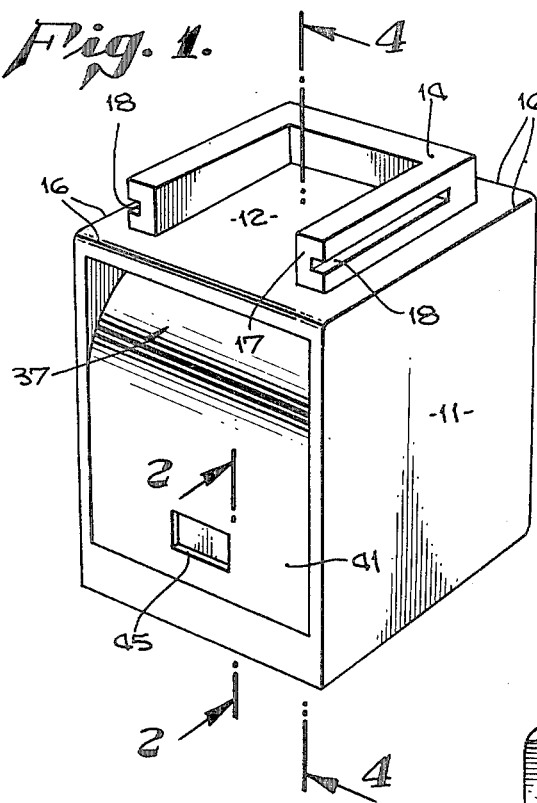
FIG. 1 is a front perspective view of a modular bowling ball storage case in accordance with the present invention.

An understanding of the present invention bowling ball storage cases can be best seen by reference to FIG. 1 wherein the storage case is generally designated by the reference numeral 10. The structure of bowling ball storage case 10 utilizes a uniform geometrical profile which will permit modules of the structure to be vertically stacked. The form of the present invention shown in FIG. 1 utilizes a substantially cubical configuration, although the scope of the present invention encompasses a broader range of geometrical shapes. Bowling ball storage case 10 has substantially uniform side walls 11, upper wall 12, bottom wall 13 and a rear wall (not shown). The top and bottom walls 12 and 13 are fitted with interlocking members 14 and 15 which permit a storage case 10 to be vertically mated with a similar module.

Figure 3:
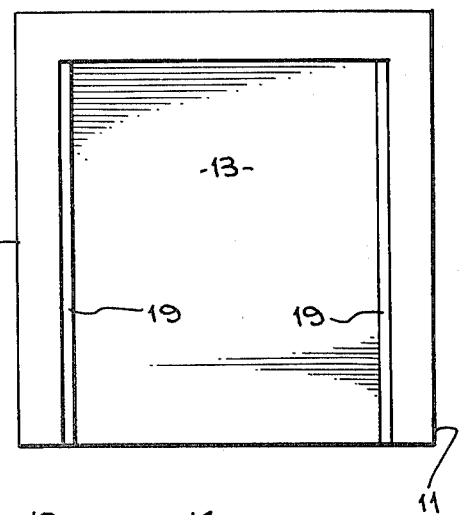
FIG. 3 is a bottom, plan view of the bowling ball storage case shown in FIG. 1.
Figure 2:
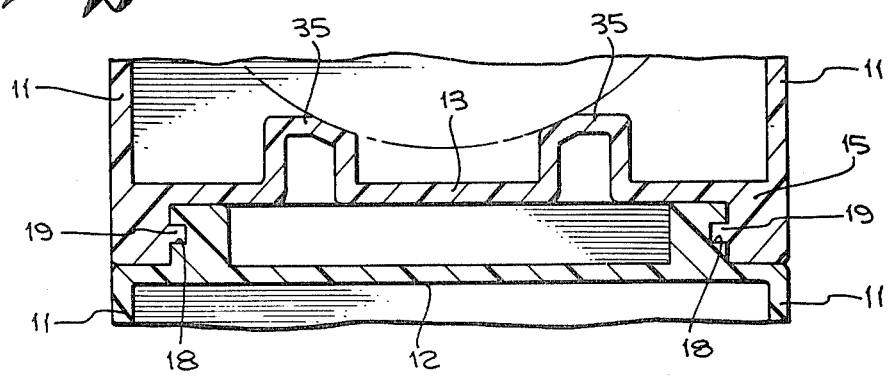
FIG. 2 is an enlarged partial cross-sectional view of the bowling ball storage case shown in FIG. 1 taken through line 2—2 of FIG. 1 shown coupled to a mating module.

Referring now to FIG. 1 and FIG. 3, an exemplary form of interlocking members 14 and 15 can be best seen. Interlocking member 14 depends from the top surface of bowling ball storage case 10. Although the preferred embodiments of the present invention utilize an integral structure between case 10 and interlocking members 14 and 15, it is within the scope of the present invention to utilize a structure wherein members 14 and 15 can be constructed separate from case 10 and assembled in the manner shown. Interlocking member 14 is a substantially U-shaped structure, the legs thereof being parallel to the boundaries 16 of top wall 12. The interval between the legs of interlocking member 14 and boundaries 16 is substantially equal on all sides, including the opening in the U-shaped interlocking member, the interval there being measured by the interval between the front abuttment 17 and the adjacent boundary 16 of top wall 12. Although interlocking member 14 is shown in substantially a U-shaped configuration, it is clear that interlocking member 14 could be a fully enclosed square configuration or other like shape incorporating the uniform interval between it and boundary 16. As can be best seen in FIG. 2, grooves 18 are disposed along the outer surface of the legs of interlocking member 14. As will be described in detail hereinbelow, grooves 18 are adapted to receive the mating tongues 19 of the mating interlocking member 15. In a form of the present invention which does not require vertical interconnection between adjacent modules, groove 18 can be omitted, the ungrooved configuration for interlocking member 14 still preventing lateral displacement of adjacent modules 10. In this form of the present invention, the only requirement is that lateral movement will not dislodge a stacked case 10. Therefore, an interlocking member need only require a vertical surface which will oppose a laterally directed force irrespective of its direction, e.g., a triangle. The bottom wall 13 of each of the bowling ball storage cases 10 is recessed. As can be best seen in FIG. 2 and FIG. 3, interlocking member 15 comprises the lower boundaries of storage case 10. Each of the side walls 11 depends laterally inwardly forming the structure for interlocking member 15. Along the inner surface of the portion of interlocking member 15 adjacent side walls 11, parallel tongue projections 19 are molded. As can be seen in FIG. 2, the tongue and groove mating members 19 and 18 respectively, form a coupled structure which will prevent vertical displacement of adjacent modules. As with the case of interlocking member 14, it is clear that interlocking member 15 could be a fully enclosed square configuration, or any other closed geometrical configuration and need not utilize tongue projections 19 if only lateral displacement is to be avoided. In this latter form of the present invention, interlocking members 14 and 15 would be vertically mated thereby preventing inadvertent lateral movement of adjacent modules.

In order to increase the flexibility in the use of the present invention, an alternative form of the present invention is shown in FIG. 6 and FIG. 7, the alternative form being designated by the reference numeral 25. As shown in FIG. 6, interlocking member 25 is a substantially square configuration. Top interlocking member 26 depends upwardly from storage case top wall 27. The peripheral wall 28 is substantially perpendicular to top wall 27. The interval between boundary 29 of top wall 27 and the base of peripheral side walls 28 of top interlocking member 26 is substantially uniform about the entire distance of peripheral side wall 28. As can be seen in FIG. 7, lower interlocking member 30 depends downwardly from the bottom wall of the housing in a manner similar to that described in connection with FIG. 3. In the embodiment shown in FIG. 7, bottom interlocking member 30 is substantially uniform about the entire periphery, the inner surface 31 being substantially perpendicular to bottom wall 32 and adapted to be slidably disposed about peripheral side wall 28 of top interlocking member 26. In order to lock the present invention storage cases 25 in vertical alignment, a resilient, spring-loaded projection arm 33 extends outwardly from one or more surfaces of peripheral side walls 28. Detent 34 is adapted to be aligned with projection pin 33. Detent 34 preferably comprises an aperture through bottom 32 which is adapted to receive projection pin 33. The pin 33 can be manually pushed from the outside to vertically release interlocked cases 25. Projection pin 33 is spring-loaded in a conventional manner and therefore will exert sufficient force against detect 34 to maintain the interlocked status between lower interlocking member 30 and upper interlocking member 26. As an alternative, detent 34 can be implemented by a depression which is crescent shaped thereby permitting one storage case 25 to be removed from the interlocked space by merely overcoming the force imposed by spring-loaded projection pin 33 against detent 34. In order to carry storage case 25, handle 60 is adapted to be rotatably affixed to projection 61 which will lie within top interlocking member 26. When it is desired to stack all storage cases 25 in the manner to be discussed in connection with FIG. 5, handle 60 can be rotated within the depression formed by side walls 28.

Figure 4:
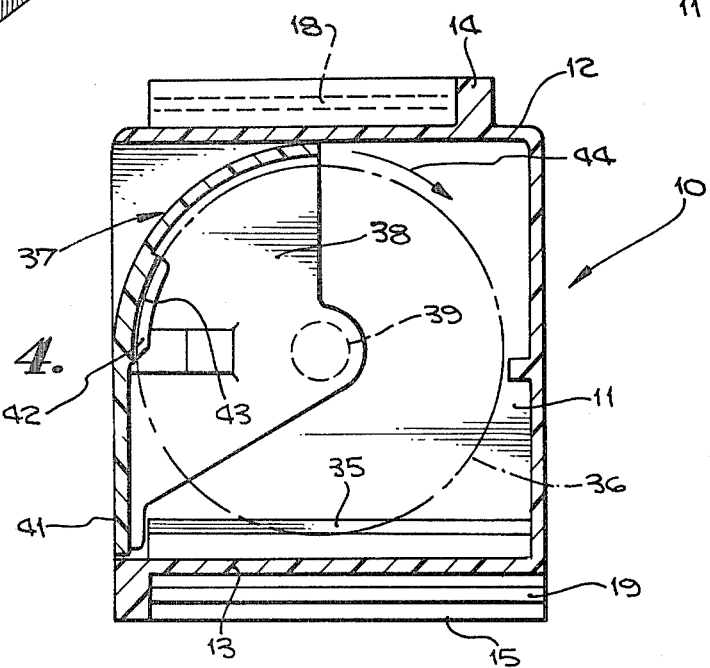
FIG. 4 is a cross-sectional view of the bowling ball storage case shown in FIG. 1 taken through line 4—4 of FIG. 1.

When the modular storage cases 10 or 25 respectively, are in a stacked condition, other than the top case 10 or 25, all of the remaining modules will be accessible only at their lateral walls. Referring now to FIG. 4, an understanding of the manner in which the interior compartment of the cases 10 are accessible can be best seen. A bowling ball 36, shown in phantom line, is adapted to be disposed upon a pedestal 35 which is located on bottom wall 13. The outer walls of storage case 10 are adapted to lie as close to the surface of the bowling ball 36 as possible. Cover 37 is secured between side walls 11 at substantially the midpoint thereof. Cover 37 is comprised of a side flange 38 which lies substantially parallel to wall 11, flange 38 being rotatably coupled at pivot 39 to side wall 11. The upper portion 40 of cover 37 has a circular radius about pivot 39. When cover 37 is rotated clockwise in the configuration shown in FIG. 4, radial portion 40 of cover 37 will rotate substantially adjacent the surface of ball 36 until the opening in the front surface of storage case 10 provides access to bowling ball 36. Radial portion 40 tangentially depends into a lower flattened section 41 which will lie substantially flush with the front face of storage case 10 or 25 when cover 37 is closed. In order to prevent ball 36 from moving about within the interior of the compartment of storage case 10 or 25, concave shim 42 depends inwardly from lower portion 41 of cover 37 at substantially the midpoint of ball 36. The concave profile 43 of shim 42 is adapted to contact the ball above its midline when cover 37 is in the closed position. As shown in FIG. 4, with shim 42 in place, ball 36 cannot move vertically since force vectors are imposed by the concave surface 43 of shim 42. When cover 37 is raised, it will be rotated in the manner shown by directional arrow 44, shim 43 moving adjacent and above ball 36. Referring again to FIG. 1, the user of the present invention bowling ball storage case 10 or 25 can utilize the gripping aperture 45 to raise or lower cover 37. In this manner, ball 36 will be accessible irrespective of whether storage case modules 10 or 25 are in place and stacked one upon the other.

As stated previously, an objective of the present invention is to provide a modular bowling ball storage case which can be easily transported. Referring now to FIG. 5, a moving apparatus is shown which is adapted to operate with the modular cases shown in FIGS. 1-4, the moving apparatus being generally designated by the reference numeral 50. Moving apparatus 50 is a cart which employs one or two sets of wheels 51 which will facilitate moving stacked cases 10 or 25. The form of the cart 50 shown in FIG. 5 employs only a single pair of rear wheels 51, but it is clear that a front set of wheels and an accompanying axle can be employed. The platform 52 of a cart 50 is adapted to lie substantially parallel with the floor surface and has disposed thereon an interlocking member 53 which operates substantially similar to interlocking member 14 or interlocking member 15 described hereinabove. In the form of the present invention shown in FIG. 5, interlocking member 53 comprises a substantially U-shaped structure having inwardly directed receiving grooves 54 which are substantially the same as grooves 18 and 26 described hereinabove. When adapted to stock storage cases 10, a first storage case 10 is mated with interlocking member 53 by interfacing the projecting tongues 19 of interlocking member 15 with the mating member 53 in the manner shown in FIG. 2. Once in place, the modules 10 are disposed one upon the other in the manner shown in FIG. 2. The moving apparatus 50 shown in FIG. 5 employs a front compartment 55 which can be used to store various forms of equipment such as bowling gloves, shoes, etc. In order to provide movement to apparatus 50, adjustable handle 56 is affixed adjacent surface 52 in intermediate wheels 51. The adjustment to handle 56 will compensate for the number of stacked modules 10 which are employed. When cart 50 is adapted to stack storage cases 25, the interlocking member designated by the reference numeral 53 will be replaced by one which is substantially similiar to top interlocking member 26 described in connection with FIG. 6.

The present invention provides a modular bowling ball storage case which will facilitate the storage, stacking and transport of heavy bowling balls. By providing a uniform structure which can be stacked and interlocked, the otherwise clumsy and heavy objects can be maintained in an orderly manner and in a way which will conserve space. The present invention also provides means for access to the modules when they are in a stacked position thereby providing for ease of operation as well as maintaining the overall efficiency of the system.

I claim:

1. A bowling ball storage and transporting apparatus comprising:
    (a) a geometrically uniform housing having parallel upper and lower walls, said housing having an interior compartment adapted to fully enclose the bowling ball and an opening in a front wall therefor for ingress to said interior compartment;
    (b) a first interlocking member depending from the upper wall of said housing, said first interlocking member projecting upwardly from said upper wall and having at least three contiguous vertical surfaces perpendicular thereto;
    (c) a second interlocking member depending from the bottom wall of said housing, said second interlocking member being adapted to engage said first interlocking member whereby said first and second interlocking members are laterally coupled to one another;
    (d) a covering member having first and second side flanges pivotally coupled within the interior compartment of said housing, a first curved section disposed intermediate said first and second side flanges, said curved section tangentially depending into a lower front wall for said housing and including a shim affixed to the inside of said covering member within the interior compartment of said housing, said shim having a concave profile substantially the same as the bowling ball and adapted to be urged against the midline of the bowling ball; and
    (e) a wheeled platform having an interlocking member depending from said platform adapted to be engaged with the second interlocking member of a housing.

2. A bowling ball storage and transporting apparatus as defined in claim 1 wherein said first interlocking member comprises four contiguous vertical surfaces projecting upwardly from the upper wall of said housing each of said walls being parallel to the edges of said upper wall, said vertical surfaces being separated by a depression intermediate said vertical surfaces, and a handle secured between two of the opposed vertical walls, said handle being disposed across said depression whereby said housing can be lifted by said handle.

3. A bowling ball storage and transporting apparatus as defined in claim 2 wherein said first interlocking member includes a resiliently loaded projection pin depending outwardly from one of the vertical surfaces of said first interlocking member, and said second interlocking member includes a receiving surface adapted to engage said resiliently loaded projection pin and prohibit vertical movement thereof when the first interlocking member of a first bowling ball storage and transporting apparatus engages the second interlocking member of a second bowling ball storage and transporting apparatus.

4. A bowling ball storage and transporting apparatus as defined in claim 1 wherein the upper and lower walls of said housing are rectangular, said first interlocking member comprising at least three vertical surfaces perpendicular to the upper wall of said housing, each of said vertical surfaces being parallel to and uniformly spaced from the edges of said upper wall, said second interlocking member comprising at least three vertical surfaces perpendicular to the bottom wall of said housing and having substantially the same geometrical configuration as the first interlocking member, the vertical surfaces of said second interlocking member being adapted to laterally engage vertical surfaces of said first interlocking member.

5. A bowling ball storage and transporting apparatus comprising:
(a) a geometrically uniform housing having parallel upper and lower walls, said housing having an interior compartment adapted to fully enclose the bowling ball and an opening in a front wall thereof for ingress to said interior compartment;
(b) a first interlocking member depending from the upper wall of said housing, said first interlocking member comprising a substantially U-shaped member having a pair of parallel legs and a base joining said legs, said legs having a uniform depression formed in the vertical surfaces of said legs parallel to the upper wall of said housing;
(c) a second interlocking member depending from the bottom wall of said housing, said second interlocking member being adapted to engage said first interlocking member whereby said first and second interlocking members are laterally coupled to one another;
(d) a covering member having first and second side flanges pivotally coupled within the interior compartment of said housing, a first curved section disposed intermediate said first and second side flanges, said curved section tangentially depending into a lower front wall for said housing and including a shim affixed to the inside of said covering member within the interior compartment of said housing, said shim having a concave profile substantially the same as the bowling ball and adapted to be urged against the midline of the bowling ball; and
(e) a wheeled platform having an interlocking member depending from said platform adapted to be engaged with the second interlocking member of a housing.

6. A bowling ball storage and transporting apparatus as defined in claim 5 wherein said second interlocking member is a substantially U-shaped member having a pair of parallel legs and a base joining said legs, each of said legs having a uniform projection from the vertical surfaces of said legs parallel to the bottom wall of said housing, said projections being adapted to be received within the depressions in the vertical surfaces of said first interlocking member.

* * * * *